UNITED STATES PATENT OFFICE.

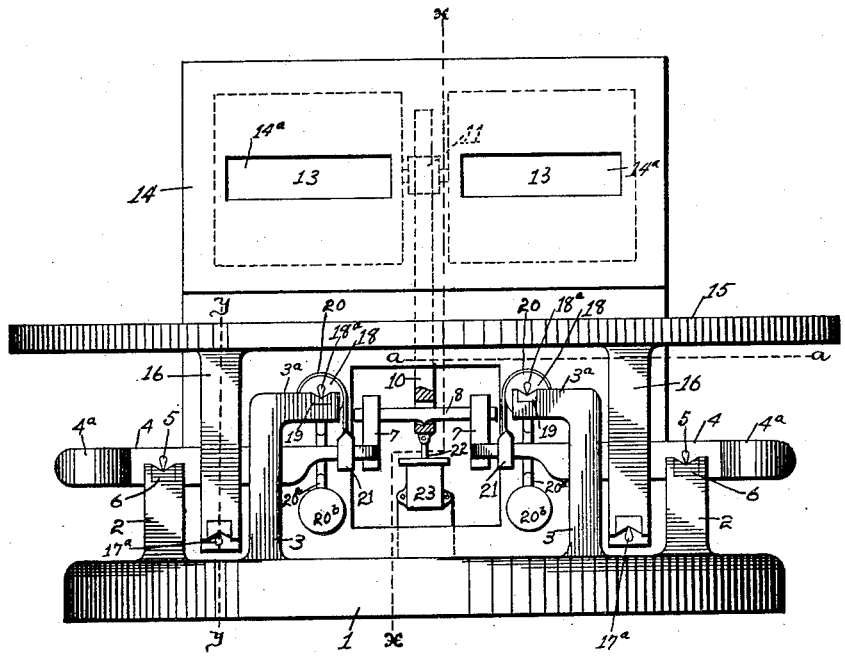

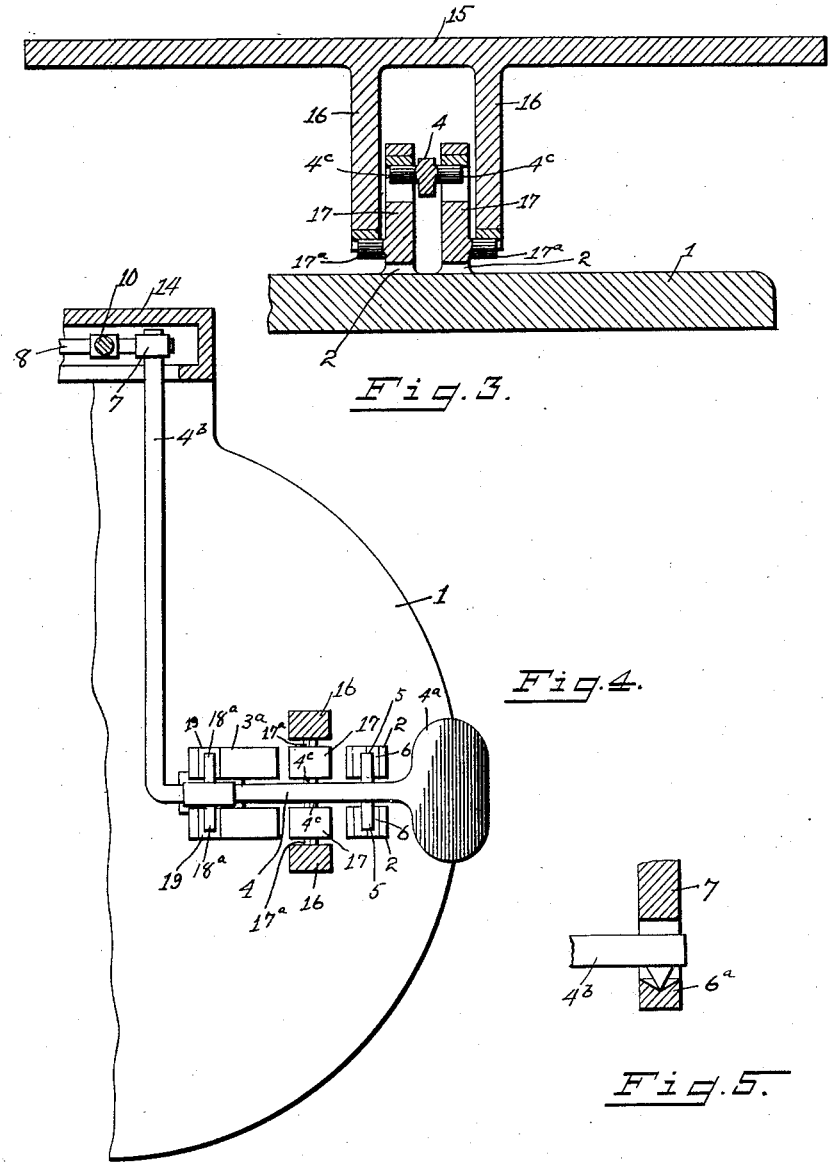

JOHN STURGUS BRADLEY, OF NEW CONCORD, OHIO.

PLATFORM COMPUTING-SCALE.

No. 909,744.  Specification of Letters Patent.  Patented Jan. 12, 1909.

Application filed July 25, 1908. Serial No. 445,338.

*To all whom it may concern:*

Be it known that I, JOHN STURGUS BRADLEY, a citizen of the United States, residing at New Concord, in the county of Muskingum and State of Ohio, have invented certain new and useful Improvements in Platform Computing-Scales, of which the following is a specification.

My invention relates to the improvement of platform computing scales and the objects of my invention are to provide an improved construction of scales of this class wherein is provided improved means for distributing the weight effect; to secure a corresponding action of the weighing parts of my device regardless of the position of the weight on the weighing platform and to produce certain improvements in details of construction and arrangement of parts which will be more fully pointed out hereinafter. These objects I accomplish in the manner illustrated in the accompanying drawings, in which:

Figure 1 is a front elevation of my improved scales, Fig. 2 is a vertical section on line $x$—$x$ of Fig. 1, Fig. 3 is a sectional view on line $y$—$y$ of Fig. 1, Fig. 4 is a sectional view on line $a$—$a$ of Fig. 1, and, Fig. 5, is a detail sectional view illustrating the pivotal bearing connection between a scale beam extension and the chart or indicator operating bar.

Similar numerals refer to similar parts throughout the several views.

1 represents the horizontal supporting base of the scales, from opposite sides of the center of which rise pairs of parallel bearing standards 2 and rising from the base 1 on the inner side of each of the standards 2 is a pair of vertical and parallel standards 3, the upper portions of which are bent inwardly to form horizontal terminal arms $3^a$.

4 represent opposing scale beams which are weighted at their outer ends as indicated at $4^a$, each of said beams being provided adjacent to its weighted outer end portion with laterally projecting knife edge bearings 5, the lower edge portions of which bear in the inclined recesses or central notches of agate bearings 6 mounted in the upper portions of the standards 2. On the inner side of the standards 2, the scale beams extend between the standards 3 beyond which said scale beams are bent or turned rearwardly at right angles, thereby forming parallel rearwardly extending beam extensions $4^b$. The rear end portion of each of the beam extensions $4^b$ is provided with a downwardly projecting knife edge bearing which contacts with the central notch of an agate bearing $6^a$ which is carried in the lower end of a slotted hanger 7. Through the upper end portions of these hangers pass loosely the ends of a transverse equalizing bar 8, the latter having upper side knife blade projections, which contact with bearings 9 in the upper end portions of said hangers. The equalizing bar 8 passes through and is centrally suspended in a slotted opening formed in the lower end portion of a vertical chart operating bar 10, and the upper outwardly bent portion of which is toothed on its forward face as indicated at $10^a$. The toothed upper portion $10^a$ of the bar 10 engages a pinion wheel 11 carried on the usual chart cylinder operating shaft 12 through the rotation of which a chart cylinder 13 is made to display weight and price indicating figures or characters through a sight opening $14^a$ of a casing 14 in the usual manner. The construction and arrangement of the parts of the rotary chart and its supporting shaft are well known, however, and therefore are not illustrated in details herein.

15 represents a horizontally disposed scale platform or weighing tray, which has depending therefrom on each side of its center a pair of vertical arms 16 which extend on opposite sides of the corresponding scale beam 4 and which have their lower terminations above the platform 1. Between each pair of arms 16, I provide a pair of vertically disposed hanger bars 17, with the upper slotted end portions of which engage knife blade bearing projections $4^c$ of the beam 4. The lower end portions of the hangers 17 are provided with lateral bearing projections $17^a$, which have a bearing engagement with the undersides of the platform arms 16.

Between the upper horizontal portions of each pair of standard arms $3^a$ is pivoted a disk 18, this pivotal connection being effected by providing said disk with oppositely located knife edge bearing projections $18^a$, the lower edges of which bear in the V-shaped upper sides of agate bearings 19 carried by said standard terminations $3^a$. Each of the disks 18 has connected therewith one end of a flexible strap 20, which strap running partly over or about said disk, depends therefrom and carries a hanger 21 through which passes loosely the inner end portion of the corresponding beam 4, said beam being provided with a knife edge bearing in the lower portion of said hanger. From each of the disks 20 depends a weight carrying arm $20^a$ which terminates in a suitable weight or pendulum $20^b$.

To the lower end of the bar 10 I attach the upper end of the piston rod 22 of the usual form of dash pot or resistance cylinder 23 which is suitably affixed to the framework.

In operation it will be understood that a weight placed on the platform 15 and a consequent downward movement of the arms 16, will result through the connections and contacts heretofore described in a downward swinging movement of the end portions of the beams 4 and their extensions $4^b$. In this movement of said beams, it is obvious that partial rotary motion will be imparted to the disks 18 and a consequent upward and outward swinging movement of the pendulums carried by said disks, the pendulum weights thus offering resistance in proportion to the weight placed on the platform. Through the corresponding movement of the opposing beams 4 and the connection of the hangers 7 with the equalizing bar 8 and the central contact of the latter with the operating bar 10, it is obvious that a straight vertical downward movement will be imparted to said operating bar, which through the engagement of its rack portion with the pinion 11, will impart the desired rotation to the chart shaft 12. The employment of the opposing scale beams and duplicate pendulums of equal weight and the connection of said beams with the equalizing bar, must result as will readily be seen, in imparting the same degree of downward movement to the operating bar 10 when a weight is supported on the platform centrally or at one side of the center thereof, thereby insuring a uniform and accurate operation of the operating bar regardless of the position of the weight applied to the platform. It is also obvious that the weight indicated will be the same even though the scales are supported at an inclination from a vertical position.

What I claim, is:

In a weighing mechanism, the combination with a base, a pair of opposing beams fulcrumed above said base, a suspended pendulum for each of said beams, and connections between said beams and pendulums, of an equalizing bar pivotally connecting said beams, an indicator operating bar to which said equalizing bar is centrally engaged, and a platform supported by said beams.

In testimony whereof I affix my signature in presence of two witnesses.

JOHN STURGUS BRADLEY.

Witnesses:
 L. CARL STOUGHTON,
 C. C. SHEPHERD.